United States Patent Office.

CHARLES MARTIN, OF BRUSSELS, BELGIUM, ASSIGNOR TO THE COMPAGNIE DE METALLURGIE GÉNÉRALE, OF SAME PLACE.

PROCESS OF CHEMICALLY PREPARING AND TREATING REBELLIOUS ORES.

SPECIFICATION forming part of Letters Patent No. 635,695, dated October 24, 1899.

Application filed November 16, 1897. Serial No. 658,743. (No specimens.)

*To all whom it may concern:*

Be it known that I, CHARLES MARTIN, chemical expert, of 30 Rue Vendel, Brussels, in the Kingdom of Belgium, have invented a new and useful Process of Preparation and Treatment of Ores other than Iron Ores, of which the following is a full, clear, and exact description.

This invention relates to a process for chemically preparing and treating rebellious ores, in particular those ores which are sulfurized ores—for instance, pyrites; and it has for its object to enable subsequent complete extraction of the various metals contained in the ore to be effected by any suitable process.

For the purposes of this invention the ore must be first subjected to a mechanical preparation, which consists in dry-crushing the same without the addition of any foreign matter, it being also advantageous when the metalliferous and sterile portions of the ore present a sufficient difference of density to enrich or concentrate the ore by washing. The crushed and washed ore is then mixed with suitable proportions of sulfid of iron and an alkali metal sulfid or sulfate, preferably sulfate of sodium. When the ore is sufficiently pyritic, the addition of sulfid of iron may be dispensed with. The mixture thus constituted is heated out of contact with the air until it attains the condition of pasty fusion, whereupon the mixture, as nearly as possible in the incandescent state, is thrown into water in order to completely disintegrate it by the sudden cooling.

In practice the alkaline sulfid may be replaced by a sulfate of the same category, the reduction of this sulfate to sulfid being effected during the incineration either by the sulfur of the ore if contained in sufficient quantity or by sulfur added to the mixture. This reduction may also be effected by means of carbon according to a known process.

The partly-solid partly-liquid matters obtained by throwing the mixture into water, as above mentioned, contains in solution the greater part of the metals—to wit, tin, lead, gold, silver, platinum, palladium, &c.—which were contained in the ore, as well as a part of the metalloids—such as arsenic, antimony, and tellurium—whose presence rendered the ore difficultly and incompletely treatable by any process of extraction actually in use. In order to render these processes available, it is necessary to effect the precipitation of the dissolved metallic salts. With this object I add to the matters to be treated an oxid of an alkali earth metal, particularly oxid of calcium, either in a state of purity or as a hydrate or in the form of an unstable salt— say lactate or sucrate of lime—easily decomposable in the presence of the dissolved metallic salts. The effect of this addition is that while a portion of the objectionable metalloids, such as tellurium, will be left in solution in the residual liquid the remainder of the metallic salts—such as sulfates of iron, of gold, and of silver—and the residue of the metalloids—for instance, arsenic and antimony—will be precipitated in such a physical and chemical condition that it is possible to separately and completely extract by any suitable process of extraction these remaining metalloids and the various metals from the solid matter separated from the residual liquid by filtration.

Having now particularly described and ascertained the nature of the said invention and in what manner the same is to be performed, I declare that what I claim is—

1. A process of preparing and treating rebellious ores such as gold and silver ores, said ores containing arsenic or antimony, as hereinbefore described, with the object of rendering the objectionable arsenic or antimony and the said gold and silver easily, completely and separately extractible, which consists in producing a sulfid solution of the metals in said ore and mingling with the same an oxid of an alkali earth metal, particularly oxid of calcium thereby precipitating the precious metals from the solution, as described.

2. The herein-described process of effecting the separation of gold, silver, tin, lead, and platinum in pulverized rebellious ore containing arsenic and antimony which consists in effecting sulfurization and disintegration of the said ore, producing a sulfid solution of the metals in said ore, and thereupon precipitating the dissolved metallic compounds other than arsenic and antimony by mingling the same with an oxid of an alkali earth metal.

Signed by me, the said CHARLES MARTIN, this 29th day of October, 1897.

CHARLES MARTIN.

In presence of—
  NICOLAS DUFLAT,
  EHÉODORE QUINET.